United States Patent [19]

Banon et al.

[11] Patent Number: 4,709,179
[45] Date of Patent: Nov. 24, 1987

[54] PERMANENT-MAGNET SIX-POLE SYNCHRONOUS ELECTRODYNAMIC MACHINE

[75] Inventors: Louis Banon, Paris; Michel Lajoie-Mazenc, Montgiscard; Pierre Mathieu, Olivet, all of France

[73] Assignee: Regie Nationale des Usines Renault, Boulogne-Billancourt, France

[21] Appl. No.: 766,342

[22] Filed: Aug. 16, 1985

Related U.S. Application Data

[63] Continuation-in-part of Ser. No. 692,129, Jan. 17, 1985, abandoned.

[30] Foreign Application Priority Data

Jan. 17, 1984 [FR] France ................................. 84 00642
Apr. 23, 1985 [FR] France ................................. 85 06143

[51] Int. Cl.$^4$ ............................................. H02K 21/12
[52] U.S. Cl. ..................... 310/156; 310/162; 310/261
[58] Field of Search ............... 310/156, 216, 218, 261, 310/265, 162

[56] References Cited

U.S. PATENT DOCUMENTS 3,014,142 12/1961 Lee ...................................... 310/156
4,405,873 9/1983 Nondahl .............................. 310/156
4,568,846 2/1986 Kapadia ............................... 310/216

Primary Examiner—Patrick R. Salce
Assistant Examiner—D. L. Rebsch
Attorney, Agent, or Firm—Oblon, Fisher, Spivak, McClelland, & Maier

[57] ABSTRACT

The machine includes a rotor of the flux concentration type. Six permanent magnets of the high-energy type are mounted on a shaft. Between the magnets are placed pole pieces made of ferrosilicon magnetic sheets. A stator is composed of ferrosilicon magnetic material in which are formed a plurality of half-closed slots which receive inducted windings. An air gap is formed between the rotor and the stator. The ratio $r_1$ of the height of the section of the magnets through which the induction flux passes to the width of the air gap is between 0.281 and 0.344.

24 Claims, 2 Drawing Figures

PERMANENT-MAGNET SIX-POLE SYNCHRONOUS ELECTRODYNAMIC MACHINE

BACKGROUND OF THE INVENTION

Cross-referenced to related application

This application is a continuation-in-part of application Ser. No. 692,129, filed Jan. 17, 1985, and abandoned upon the filing of this application.

1. Field of the Invention

This invention relates to a permanent-magnet synchronous machine having a strong specific torque using ordinary sheets (laminates).

2. Description of the Prior Art

Permanent-magnet synchronous machines interest manufacturers of process controls such as machine tools, robots, and manipulators. Thanks to the absence of sliding contacts (contact brushes, generator brushes, rings, commutators), they do not require any maintenance and have a life equal to that of their bearings. Therefore, they constitute progress in increased productivity and profitability of industrial equipment.

However, so far, the so-called high-performance permanent-magnet synchronous machines have been limited regard to their price/specific torque or price/specific power ratios.

To date, two large categories of these machines have been known:

First, magnet machines of the high-energy (rare earth) type using ordinary (ferrosilicon) sheets. However, the mass of such machines is not readily compatible with integration in an on-board process control axis without handicapping the process control apparatus by increasing its weight. The mass of such machines therefore makes it necessary to resort to machines with higher performance, which are still heavier and more costly. Process control specialists in this case prefer to add the machine outside the structure at the cost of more complicated transmission and therefore increased maintenance.

Second, magnet machines of the high-energy (rare earth) type using high-performance sheets, particularly ferrocobalt. The performances in specific torque and power are good with such machines and make an easier integration possible, but at the price of a considerably higher machine cost and of more delicate use because of the following problems:

The high-performance sheets, particularly of ferrocobalt, have a material cost from 60 to 100 times greater than that of ordinary sheets.

Ferrocobalt sheets are much less resistive than ordinary sheets. They have much greater specific losses for a given thickness than the specific losses for ordinary sheets. This led to choosing sheets with a very slight thickness (0.1 to 0.2 mm). The various stamping operations are then more delicate and involve increased losses, particularly from deformation, in comparison with stamping of ordinary sheets.

Unlike ordinary sheets, ferrocobalt sheets, to maintain the magnetic performance, require a high-temperature annealing operation that causes additional production costs and a reduction in production output, particularly because of deformation during annealing and handling.

The notable magnetic losses existing in ferrocobalt sheets, to maintain the specific performance of the machine, often make it necessary to resort to forced cooling of the machine (ventilation, circulation of a fluid), which is not compatible with all applications and which increases maintenance and risks of breakdowns.

In known electric machines, the state of the art calls for flux yokes and stator teeth to work under linear magnetic operating conditions for the following reasons:

minimizing of the magnetic losses as a function of the square of the induction;

possibility of using standard dimensioning models, making the hypothesis of an iron of infinite permeability (Behn Eschenburg diagrams for nonsalient machines, Blondel diagrams for salient pole machines);

magnetic sheets characterized by the designers only up to 1.7 Tesla.

GENERAL DISCUSSION OF THE INVENTION

The permanent-magnet synchronous machine according to the invention falls in the first of the above categories by its price and in the second category by its specific performance, even with natural cooling.

The invention resides in the improvement of the specific performance of known electromagnetic structures, thanks to a high magnetic saturation of the teeth and yokes of ordinary (ferrosilicon) sheets, while maintaining acceptable and fairly constant magnetic losses for the machine whether on-load or off-load.

For this purpose, the invention uses a permanent-magnet six-pole synchronous electrodynamic machine comprising a rotor of the flux concentration tape. The rotor comprises a shaft made of a nonmagnetic material on which rest six parallelepipedal radial permament magnets of the high energy type. Between the permanent magnets are placed pole pieces made of ferrosilicon magnetic sheets. Additionally, the machine comprises a stator in the form of a frame made of a ferrosilicon magnetic sheet in which are made a plurality of half-closed slots delimited by a stator yoke. The stator yoke receives induced windings. The stator and the rotor together define an air gap characterized in that the ratio $r_1$ of the height of the section of a magnet through which the induction flux passes to the width of the gap is between 0.281 and 0.344.

According to another characteristic of the invention, the ratio $r_2$ of the length of a peripheral polar half-arc of the rotor separating the opposite faces of two consecutive magnets to the height of the section of a magnet through which the induction flux passes is between 0.588 and 0.741.

Further, the ratio $r_3$ between the product of the number of stator teeth separating the stator slots multiplied by the thickness of a stator tooth separating two consecutive slots to twelve times the length of a peripheral polar half-arc of the rotor separating the opposite faces of two consecutive magnets is between 0.55 and 0.70.

Finally, the ratio $r_4$ of twelve times the radial thickness of the stator yoke to the product of the number of stator teeth separating the stator slots multiplied by the thickness of a stator tooth separating two consecutive slots is between 0.75 and 0.90.

Thus, a series of dimensioning ratios $r_1$ to $r_4$ are defined which make it possible, starting from an initial choice of a bore diameter d, to determine all the dimensions of the machine making it possible to obtain a maximum specific power or torque with use of ordinary magnetic sheets and high-energy magnets.

The ratios that have just been defined also make it possible, by a simple homothetic transformation, to transpose the ideal saturated magnetic structure to various power ranges.

BRIEF DESCRIPTION OF THE DRAWINGS

The invention will now be described with reference to the accompanying drawings in which.

DETAILED DESCRIPTION OF THE PRESENTLY PREFERRED EMBODIMENTS

Figure 1:
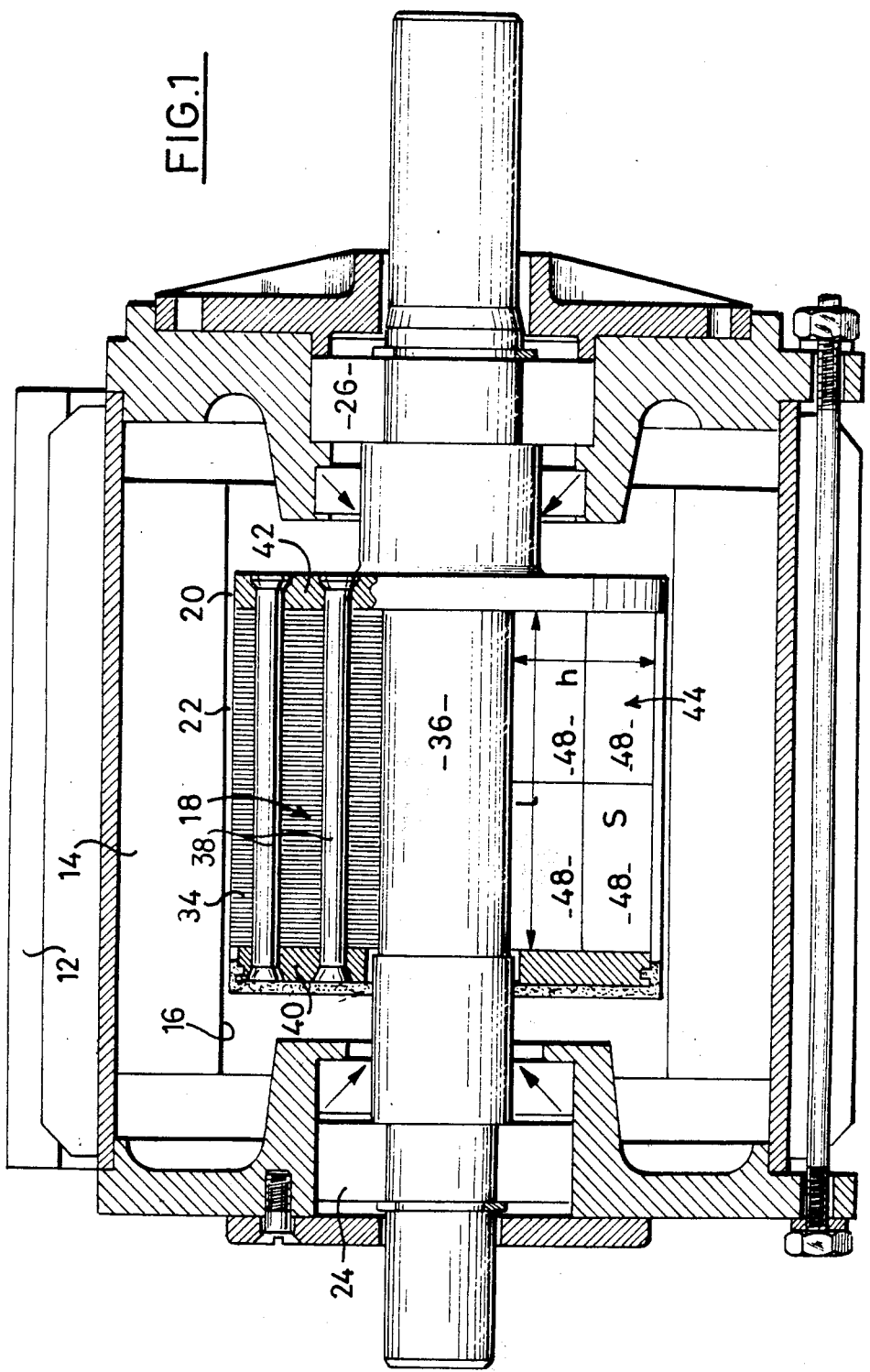
FIG. 1 is a view in axial section of a synchronous electrodynamic machine.

FIG. 1 shows an axial section of a synchronous motor. The structure of this motor is similar to that of the motor described and shown in European Published patent application No. 0 093 041 A1, the disclosure of which is hereby incorporated herein by reference.

The motor comprises a housing 12 in which is mounted a stator 14, the inside peripheral wall 16 of which cooperates with the outside peripheral wall 20 of a rotor 18 mounted in the housing 12 to define, between them, an air gap 22. The rotor 18 is mounted to rotate in the housing 12 by means of two bearings 24 and 26.

Figure 2:
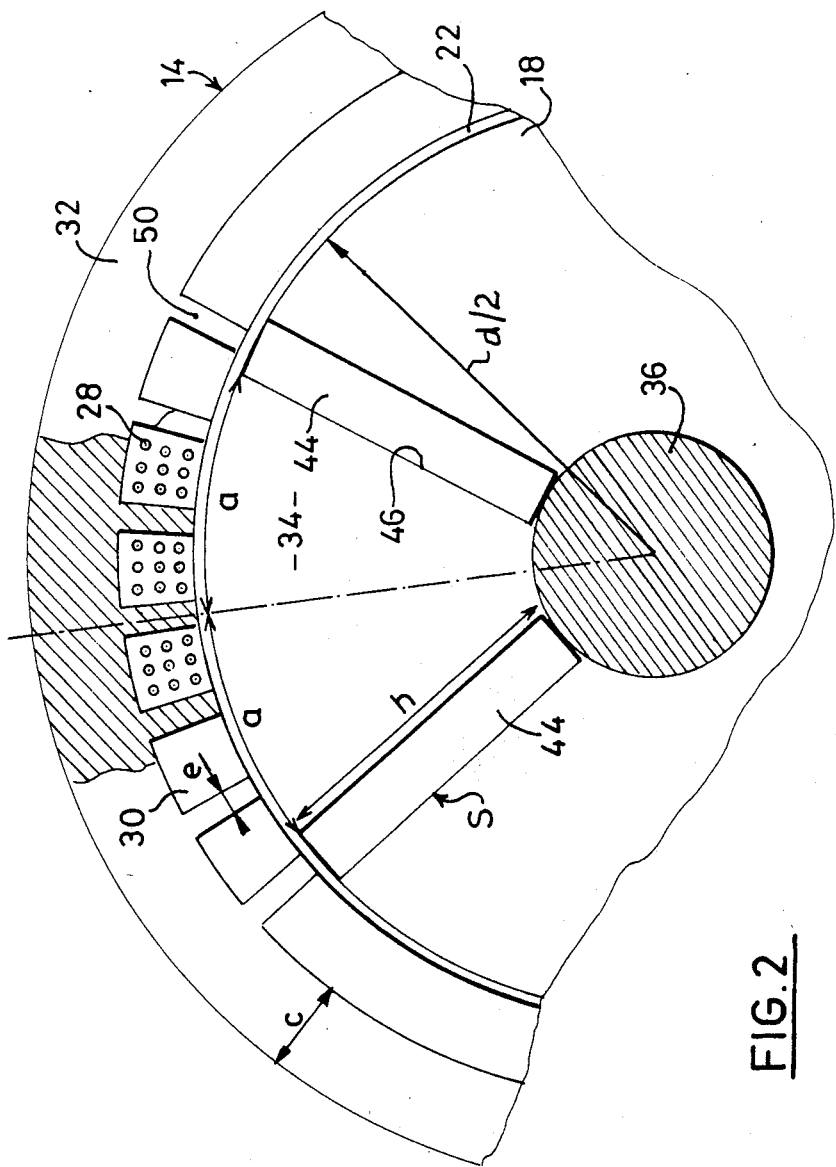
FIG. 2 is a diagrammatic view in cross section of the rotor and frame of an electrodynamic machine embodying the teachings of this invention.

As shown in FIG. 2, the stator 14 comprises a main stator winding 28 placed in half-closed slots 30 delimited by a stator yoke 32.

The rotor 18 is composed of a stack of magnetic sheets 34 slipped on a nonmagnetic shaft 36 and kept clamped by tie rods 38 between two nonmagnetic flanges 40 and 42.

The rotor 18 also comprises magnets 44 mounted in radial slots 46 and equiangularly spaced. The magnets 44 are held in the slots 46 thanks to elements mounted in recesses formed at the ends of the slots 46. This mode of fastening the magnets is shown in detail in FIG. 3 of published European patent application No. 0 093 041 A1.

Within the scope of this invention, the magnetic sheets 34 and the stator yoke 32 are made of ordinary sheets of ferrosilicon alloy.

Each of the six magnets of the six-pole rotor has a generally rectangular parallellepipedal shape and rests on the nonmagnetic shaft 36.

The magnets used are high-energy magnets—i.e., in this case, magnets having magnetic characteristics equivalent to those of magnets made from rare earths. In the embodiment shown, the magnets are made of samarium cobalt, and each magnet is composed of a plurality of parallelepipedal elementary magnets 48 assembled together for ease in production.

Each magnet is magnetized tangentially—i.e., the lines of flux leaving by a lateral section S of a magnet are approximately perpendicular to the radii of the rotor 18.

According to the invention and to obtain maximum magnetic saturation, the electrodynamic machine is dimensioned so that the ratio $r_1$ defined by the formula $$R_1 = h/d$$

in which h is the radial height of the section S of each magnet 44 through which the induction flus passes and d is the "bore diameter", between 0.281 and 0.344.

According to a preferred embodiment of the invention, the ratio $r_1$ is equal to 0.3125.

According to another characteristic of the invention, the ratio $r_2$ defined by the formula $$r_2 = a/h$$

in which a is the length of an outside peripheral polar half-arc of the rotor 18 separating opposite faces S of two consecutive magnets 44 and h is as defined before, is between 0.588 and 0.741.

According to a preferred embodiment of the invention, the ratio $r_2$ is equal to 0.658.

According to another characteristic of the invention, the ratio $r_3$ defined by the formula $$r_3 = \frac{n \times e}{12 \times a}$$

in which n is the number of stator teeth 50 separating the stator slots 30, e is the thickness of stator slots 30, and a is as defined before, is between 0.55 and 0.70.

According to a preferred embodiment of the invention, the ratio $r_3$ is equal to 0.62, the number of stator teeth 50 being equal to thirty-six.

According to another characteristic of the invention, the ratio $r_4$ defined by the formula $$r_4 = \frac{12 \times c}{n \times e}$$

in which c is the radial thickness of stator yoke 32 delimiting the stator slots 30 and n and e are as defined before, is between 0.75 and 0.90.

According to a preferred embodiment of the invention, the ratio $r_4$ is equal to 0.824.

In addition to the qualities of price, specific torque, and power, the invention offers the following advantages:

the rotor has a slight inertia and a high pulse torque from which high theoretical accelerations are derived;

because of the high saturation of the sheets, the inductances of the machine are slight, and consequently the electric time constant is slight, allowing a very fast establishment of the current and, therefore, of the torque. This phenomenon is advantageous in high-frequency, low-speed applications.

Because of the high saturation even at off-load, the inductances of the machine vary little as a function of the current, thus making possible a control of the quench frequency of power supply electronics.

The machine is salient pole by design, but, because of the high saturation of the sheets, the salience is slight. It is deduced from this that the reluctance torque of the machine is slight. This has two consequences:

(a) the law of maximum torque as a function of the current is almost linear to very high torque values (5 to 6 times the nominal torque); and (b) the electrical phase angle between tne flux and current at maximum torque is fairly constant, which facilitates the control electronics of the machine.

CAVEAT

While a preferred embodiment of the invention has been described by way of example, it should be understood that many variations of the preferred embodiments will be readily designed by those of ordinary skill in the art. Accordingly, the invention must be measured by reference to the attached claims and not solely by reference to the foregoing preferred embodiment.

What is claimed as new and desired to be secured by Letters Patent of the United States is:

1. A permanent-magnet six-pole synchronous electrodynamic machine comprising:
   (a) a rotary shaft made of non-magnetic material;
   (b) a stack of magnetic sheets made of ferrosilicon alloy slipped over said rotary shaft;
   (c) six parallellepipedal radial permanent magnets mounted in radial slots in said stack of magnetic sheets; and
   (d) a stator made of ferrosilicon magnetic sheet material surrounding said stack of magnetic sheets and radially spaced therefrom to leave an air gap therebetween, said stator having formed therein a plurality of half-closed slots delimited by a stator yoke, stator windings being received in said plurality of half-closed slots,
   wherein:
   (e) said six parallelepipedal radial permanent magnets are at least substantially identical;
   (f) the ratio $r_1$ of the height (h) of the section of said permanent magnets through which the inductance flux passes to the inner diameter (d) of said stator is between 0.0281 and 0.344;
   (g) said six parallelepipedal radial permanent magnets are equiangularly spaced around said rotary shaft; and
   (h) the ratio $r_2$ of the length (a) of a peripheral polar half-arc separating the opposite faces of two consecutive ones of said six parallelepipedal radial permanent magnets to the height (h) is equal to 0.658.

2. A permanent-magnet six-pole synchronous electrodynamic machine as recited in claim 1 wherein the ratio $r_1$ is equal to 0.3125.

3. A permanent-magnet six-pole synchronous electrodynamic machine as recited in claim 1 wherein each of said six parallelepipedal radial permanent magnets is made of samarium cobalt.

4. A permanent-magnet six-pole synchronous electrodynamic machine as recited in claim 1 wherein each of said six parallelepipedal radial permanent magnets is assembled from a plurality of parallelepipedal elementary magnets.

5. A permanent-magnet six-pole synchronous electrodynamic machine as recited in claim 1 wherein:
   (a) said plurality of half-closed slots are equiangularly spaced around said rotary shaft;
   (b) said plurality of half-closed slots define stator teeth therebetween; and
   (c) the ratio $r_3$ of the product of the number (n) of stator teeth separating said half-closed stator slots and the circumferential thickness (e) of each stator tooth to twelve times the length (a) is between 0.55 and 0.70.

6. A permanent-magnet six-pole synchronous electrodynamic machine as recited in claim 5 wherein the ratio $r_3$ is equal to 0.62.

7. A permanent-magnet six-pole synchronous electrodynamic machine as recited in claim 5 wherein the number (n) is 36.

8. A permanent-magnet six-pole synchronous electrodynamic machine as recited in claim 5 wherein:
   (a) the stator yoke has a uniform radial thickness (c) and
   (b) the ratio $r_4$ of twelve times the radial thickness (c) to the product of the number (n) and the thickness (e) is between 0.75 and 0.90.

9. A permanent-magnet six-pole synchronous electrodynamic machine as recited in claim 8 wherein the ratio $r_4$ is equal to 0.824.

10. A permanent-magnet six-pole synchronous electrodynamic machine as recited in claim 1 wherein said stack of magnetic sheets is clamped together axially by a plurality of axial tie rods.

11. A permanent-magnet six-pole synchronous electrodynamic machine as recited in claim 1 wherein said six parallelepipedal radial permanet magnets extend radially from said shaft to the periphery of said stack of magnetic sheets.

12. A permanent-magnet six-pole synchronous electrodynamic machine as recited in claim 1 wherein each of said six parallelepipedal radial permanent magnets has a generally rectangular parallelepipedal shape.

13. A permanent-magnet six-pole synchronous electrodynamic machine comprising:
   (a) a rotary shaft made of non-magnetic material;
   (b) a stack of magnetic sheets made of ferrosilicon alloy slipped over said rotary shaft;
   (c) six parallelepipedal radial permanent magnets mounted in radial slots in said stack of magnetic sheets; and
   (d) a stator made of ferrosilicon magnetic sheet material surrounding said stack of magnetic sheets and radially spaced therefrom to leave an air gap therebetween, said stator having formed therein a plurality of half-closed slots delimited by a stator yoke, stator windings being received in said plurality of half-closed slots,
   wherein:
   (e) said six parallelepipedal radial permanent magnets are at least substantially identical;
   (f) the ratio $r_1$ of the height (h) of the section of said permanent magnets through which the inductance flux passes to the inner diameter (d) of said stator is between 0.281 and 0.344;
   (g) said six parallelepipedal radial permanent magnets are equiangularly spaced around said rotary shaft; and
   (h) the ratio $r_2$ of the length (a) of a peripheral polar half-arc separating the opposite faces of two consecutive ones of said six parallelepipedal radial permanent magnets to the height (h) is between 0.588 and 0.741.

14. A permanent-magnetic six-pole synchronous electrodynamic machine as recited in claim 13 wherein each of said six parallelepipedal radial permanent magnets is made of samarium cobalt.

15. A permanent-magnetic six-pole synchronous electrodynamic machine as recited in claim 13 wherein each of said six parallelepipedal radial permanent magnets is assembled from a plurality of parallelepipedal elementary magnets.

16. A permanent-magnetic six-pole synchronous electrodynamic machine as recited in claim 13 wherein the ratio $r_1$ is equal to 0.3125.

17. A permanent-magnetic six-pole synchronous electrodynamic machine as recited in claim 13 wherein:
   (a) said plurality of half-closed slots are equiangularly spaced around said rotary shaft;
   (b) said plurality of half-closed slots define stator teeth therebetween; and
   (c) the ratio $r_3$ of the product of the number (n) of stator teeth separating said half-closed stator slots and the circumferential thickness (e) of each stator tooth to twelve times the length (a) is between 0.55 and 0.70.

18. A permanent-magnetic six-pole synchronous electrodynamic machine as recited in claim 17 wherein the ratio $r_3$ is equal to 0.62.

19. A permanent-magnetic six-pole synchronous electrodynamic machine as recited in claim 17 wherein the number (n) is 36.

20. A permanent-magnetic six-pole synchronous electrodynamic machine as recited in claim 17 wherein:
    (a) the stator yoke has a uniform radial thickness (c) and
    (b) the ratio $r_4$ of twelve times the radial thickness (c) to the product of the number (n) and the thickness (e) is between 0.75 and 0.90.

21. A permanent-magnetic six-pole synchronous electrodynamic machine as recited in claim 20 wherein the ratio $r_4$ is equal to 0.824.

22. A permanent-magnetic six-pole synchronous electrodynamic machine as recited in claim 13 wherein said stack of said magnetic sheets is clamped together axially by a plurality of axial tie rods.

23. A permanent-magnetic six-pole synchronous electrodynamic machine as recited in claim 13 wherein said six parallelepipedal radial permanent magnets exend radially from said shaft to the periphery of said stack of magnetic sheets.

24. A permanent-magnetic six-pole synchronous electroodynamic machine as recited in claim 13 wherein each of said six parallelepipedal radial permanent magnets has a generally rectangular parallelepipedal shape.

* * * * *